United States Patent [19]

Grimm et al.

[11] Patent Number: 4,724,349

[45] **Date of Patent: * Feb. 9, 1988**

[54] PIVOTING ARMATURE OF AN ELECTRIC CONTROL MOTOR

[75] Inventors: Gerold Grimm, Leonberg; Ulrich Kemmner, Stuttgart, both of Fed. Rep. of Germany

[73] Assignee: Robert Bosch GmbH, Stuttgart, Fed. Rep. of Germany

[ * ] Notice: The portion of the term of this patent subsequent to Jun. 3, 2003 has been disclaimed.

[21] Appl. No.: 838,071

[22] Filed: Mar. 10, 1986

[30] Foreign Application Priority Data

Jun. 27, 1985 [DE] Fed. Rep. of Germany ....... 3522993

[51] Int. Cl.[4] ................................................ H02K 1/06

[52] U.S. Cl. ............................... 310/216; 251/129.08; 310/42; 310/36; 335/272

[58] Field of Search ....................... 310/28, 29, 31, 32, 310/36, 216, 218, 42, 264, 116; 251/129.08, 129.11, 129.16; 335/272

[56] References Cited

U.S. PATENT DOCUMENTS

| | | | |
|---|---|---|---|
| 1,108,442 | 8/1914 | Hughes | 310/269 |
| 2,236,291 | 3/1941 | Kilbourne | 310/218 |
| 2,516,140 | 7/1950 | Nahman | 310/216 |
| 3,112,464 | 11/1963 | Ratajski et al. | 310/156 |
| 3,949,250 | 4/1976 | Walker et al. | 310/36 |
| 3,959,672 | 5/1976 | Walker et al. | 310/36 |
| 4,135,119 | 1/1971 | Brosens | 310/36 |
| 4,455,516 | 6/1984 | Furusho | 310/156 |
| 4,504,770 | 3/1985 | Burkel et al. | 335/272 |
| 4,593,222 | 6/1986 | Burkel et al. | 310/254 |
| 4,633,201 | 12/1986 | Ruff | 310/36 |

FOREIGN PATENT DOCUMENTS

| | | | |
|---|---|---|---|
| 110553 | 8/1941 | Sweden | 310/216 |
| 196048 | 4/1923 | United Kingdom | 310/216 |

*Primary Examiner*—Patrick R. Salce
*Assistant Examiner*—D. L. Rebsch
*Attorney, Agent, or Firm*—Edwin E. Greigg

[57] ABSTRACT

A pivoting armature which functions as part of an electric control motor is rotatably supported on a shaft in a housing of the electric control motor and has a pole carrier on which pole shoes are mounted, the pole shoes being joined to the pole carrier in a rotationally fixed manner. The pole shoes can be produced by sintering or welding on a pole shoe ring that is pressed onto the pole carrier, or by stacks of laminates.

3 Claims, 7 Drawing Figures

PIVOTING ARMATURE OF AN ELECTRIC CONTROL MOTOR

BACKGROUND OF THE INVENTION

The invention is based on a pivoting armature of an electic control motor as defined hereinafter. A pivoting armature having pole shoes machined out of the armature is already known. Not only is this known armature complicated to manufacture, with high production costs, considering that it is a mass-produced item made in large quantities, but the selection of suitable materials for it is also limited.

OBJECT AND SUMMARY OF THE INVENTION

The pivoting armature according to the invention has the advantage over the prior art that this armature is put together in a simple fashion from pole shoes and pole carriers, which can be manufactured separately by favorable methods; also, there are more options in terms of a suitable selection of materials for the various parts.

It is particularly advantageous to manufacture the pole shoes as parts of a sintered pole shoe ring and to secure them in this form on the pole carrier. It is also advantageous to make the pole shoes from sheet metal and weld them to the pole carrier. In another advantageous embodiment, the pole shoes are embodied by superimposing sheet-metal laminations concentrically on one another and are secured in this form on the pole carrier. In still another advantageous embodiment, the pole shoes are wedge-shaped, with curved flanks; this makes it possible to vary the characteristic curve of the control motor in a desired manner.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
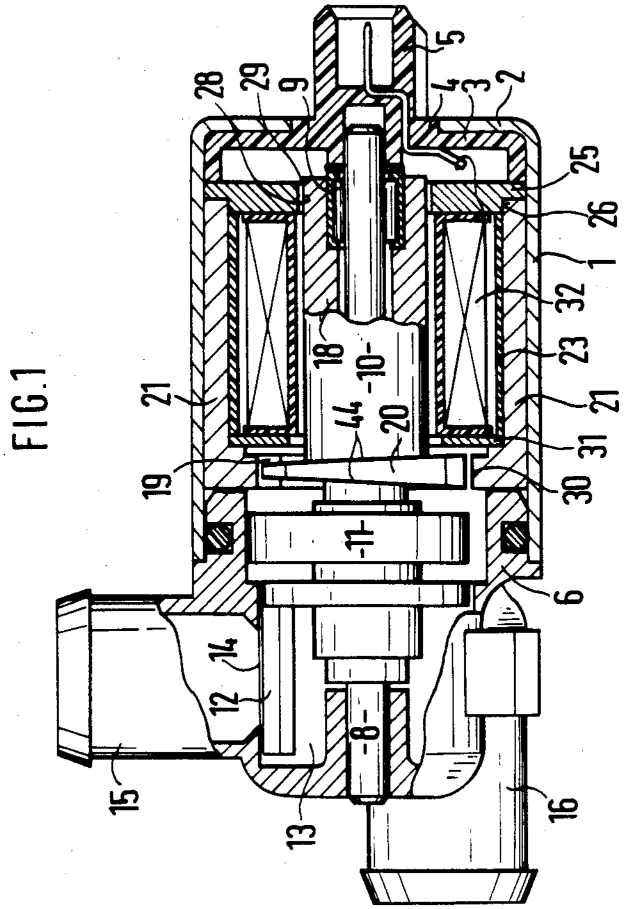
FIG. 1 shows in cross section an electric control motor having a pivoting armature.

The electric control motor shown in FIG. 1 has a cup-shaped, nonmagnetic housing 1, on the bottom 2 of which there is provided a bearing element 3 of plastic, on which an electric plug 5 that protrudes to the outside through an opening 4 of the bottom 2 is formed. A cap part 6 of nonmagnetic material closes the open end of the housing 1. A shaft 8 is pressed firmly into the bearing element 3 at one end and into the lid part 6 at the other end. A pivoting armature 10 is rotatably supported on the shaft 8, for instance via roller bearings 9, counter to a spiral spring 11 which serves as a restoring force. Joined to the pivoting armature 10 is a throttle element 12, embodied for example as a segment of a tube, which is pivotable about the shaft 8 in a pivoting space 13 of the cap part 6, thereby opening the cross section 14 of a short feed pipe 15 on the cap part 6 to a variable extent. Also formed on the cap part 6 is a short outflow pipe 16, which communicates with the pivoting space 13. The feed pipe 15 may communicate for example with a section of the intake tube upstream of a throttle valve in an internal combustion engine, not shown, and the outflow pipe 16 may communicate with a section of the intake tube downstream of the throttle valve, so that by means of the throttle element 12 a variably large flow of air can be conducted about the throttle valve of the engine, for instance in order to regulate the engine idling speed.

The pivoting armature 10 has a cylindrical pole carrier 18 and pole shoes 20, for instance of wedge shape, each of which is associated with a magnetic pole 19. In the present exemplary embodiment two magnetic poles 19 are disposed opposite one another on opposite sides of the pole shoes 20; thus the pivoting armature 10 also has two pole shoes 20, each associated with one of the magnetic poles 19. Each pole shoe 20 has a wedge-shaped contour extending crosswise to the shaft 8, such that in the direction of rotation when the pivoting armature 10 is in operation, the surface area of the magnetic poles 19 covered by each pole shoe 20 increases progressively as the rotation progresses. Each magnetic pole 19 is embodied on a rod-like, magnetically conductive guide body 21, which for instance has the cross section of a tube segment and can be made as an extruded part. The magnetic pole 19 may be formed onto each guide body 21 in a suitable manner. Each guide body 21 is introduced at the circumference of a nonmagnetic tubular carrier body 23. The carrier body 23 is preferably extruded from plastic. Remote from the magnetic poles 19, the guide bodies 21 engage a short-circuit plate 25, preferably at a collar 26. The short-circuit plate 25 rests on the bearing element 3, against which it is pressed in the axial direction by the cap part 6, via the guide bodies 21. A central bore 28 in the magnetically conductive short-circuit plate 25, together with the pole carrier 18 of the pivoting armature 10, forms a first working air gap 29, which is approximately 0.4 mm wide by way of example. A second working air gap 30, again 0.4 mm wide as an example, is formed between each magnetic pole 19 and pole shoe 20. To stabilize the second working air gaps 30, a support disk 31 of nonmagnetic material is disposed in the interior of the carrier body 23; by this means, deformation of the carrier body 23 by radial forces is avoided. An electromagnet coil 32 is disposed in the carrier body 23 between the short-circuit plate 25 and the support disk 31, gripping partway around the pole carrier 18 of the pivoting armature 10; upon electrical excitation, this coil 32 builds up a magnetic field via the plug 5, by means of which the pivoting armature 10 is rotated counter to the force of the spiral spring 11.

Figure 2:
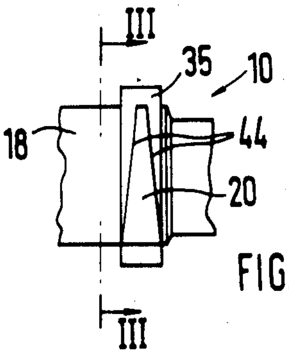
FIG. 2 shows a detail of a first exemplary embodiment of a pivoting armature embodied according to the invention.
Figure 3:
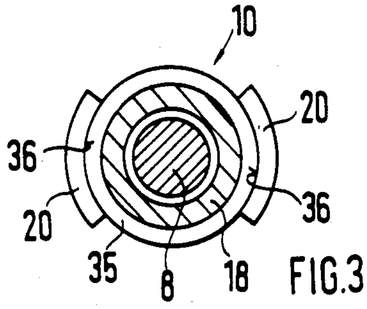
FIG. 3 is a section taken along the line III—III of FIG. 2.

FIGS. 2 and 3 provide fragmentary views of a first exemplary embodiment of a pivoting armature 10 according to the invention. The pole carrier 18 is produced by metal-removing methods and has a raised pole shoe carrier ring 35. The pole shoes 20, embodied for instance in a wedge shape as parts of a ring, are made from sheet metal, specifically by punching, bending or stamping processes. The finished pole shoes 20 are then placed upon the pole shoe carrier ring 35, opposite one another in the case where there are two pole shoes 20, and are welded to the pole shoe carrier ring 35 at 36.

Figure 4:
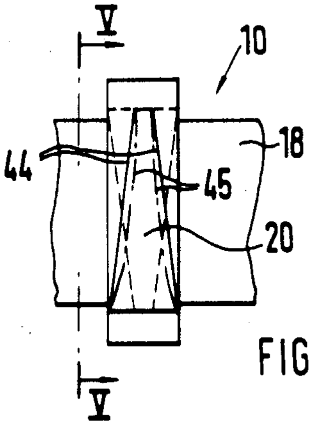
FIG. 4 shows a detail of a second exemplary embodiment of a pivoting armature embodied in accordance with the invention.
Figure 5:
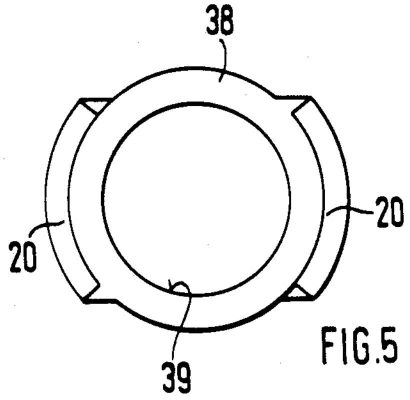
FIG. 5 is a section taken along the line V—V of FIG. 4.

In the second exemplary embodiment of the invention shown in FIGS. 4 and 5, the pole shoes 20 are sintered on at the same time as a pole shoe ring 38 is produced by sintering. The pole shoe ring 38 is secured with an inner opening 39 on the pole carrier 18, only part of which is shown here, for instance by pressing the pole shoe ring 38 onto the pole carrier 18. The pole carrier itself is produced by metal-removing manufacturing methods.

Figure 6:
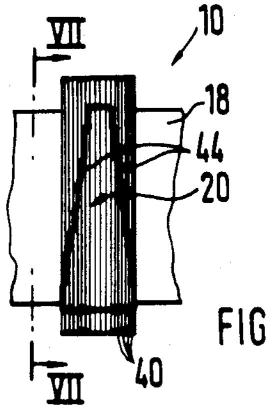
FIG. 6 shows a detail of a third exemplary embodiment of a pivoting armature embodied in accordance with the invention.
Figure 7:
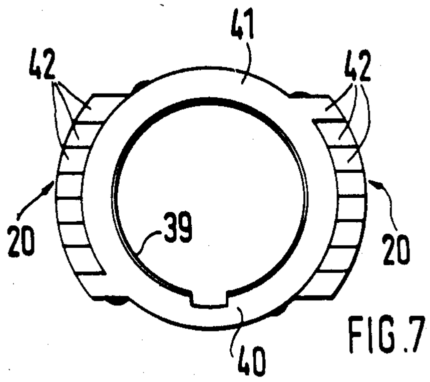
FIG. 7 is a section taken along the line VII—VII of FIG. 6.

In the third exemplary embodiment, shown in FIGS. 6 and 7, of a pivoting armature 10 according to the invention, the pole shoes 20 are formed by superimposing individual lamination sheets 40 concentrically on one another. Each lamination sheet 40 has an annular part 41 and a pole shoe part 42 that extends radially outward from the annular part. The lamination sheets 40, joined into a packet, can be kept together by welding, for instance, and placed upon the pole carrier 18 and secured thereon, for instance by exerting pressure on the annular parts 41. Here, the separately manufactured pole carrier 18 extends grippingly through the inner opening 39 of the lamination sheets 40. The pole shoe parts 42 of the individual lamination sheets 40 have different lengths in the circumferential direction, so as to attain wedge-shaped pole shoes 20; thus with a wedge shape as shown in FIGS. 6 and 7, the pole shoe parts 42 of the outer lamination sheets 40 are shorter in the circumferential direction than the pole shoe parts 42 of the lamination sheets 40 located in the interior of the lamination packet.

The wedge-shaped pole shoes 20 of all the exemplary embodiments shown in FIGS. 1-7 may have either straight flanks 44, or as shown in FIG. 4 in dot-dash lines, curved flanks 45. In this way, the characteristic curve of the control motor can be varied in an advantageous manner.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. In an electric control motor having a housing and a pivotal armature, said pivotal armature comprising a pole carrier and at least two pole shoes, said pole shoes being fitted onto said pole carrier, each of said two shoes are made in the form of an annular section from sheet metal and are welded to the pole carrier and fixed in their position relative to said pole carrier.

2. In an electric control motor having a housing and a pivotal armature, said pivotal armature comprising a pole carrier and at least two pole shoes, said at least two pole shoes being manufactured by sintering and being parts of a sintered pole shoe ring which is secured onto said pole carrier and fixed in their position relative to said pole carrier.

3. In an electric control motor having a housing and a pivotal armature, said pivotal armature comprising a pole carrier and at least two pole shoes, said at least pole shoes being formed by superimposing laminated sheets concentrically on one another, each lamination sheet having an annular part and radially outwardly extending pole shoe parts, the annular parts being secured on said pole carrier and fixed in their position relative to said pole carrier, the pole shoe parts of the individual lamination sheets having different lengths in the circumferential direction, and the lamination sheets being joined together such that wedge-shaped pole shoes are formed.

* * * * *